(12) United States Patent
Brombach

(10) Patent No.: US 12,057,702 B2
(45) Date of Patent: Aug. 6, 2024

(54) METHOD FOR MONITORING AN ELECTRICITY SUPPLY GRID

(71) Applicant: Wobben Properties GmbH, Aurich (DE)

(72) Inventor: Johannes Brombach, Berlin (DE)

(73) Assignee: Wobben Properties GmbH, Aurich (DE)

( * ) Notice: Subject to any disclaimer, the term of this patent is extended or adjusted under 35 U.S.C. 154(b) by 186 days.

(21) Appl. No.: 17/584,772

(22) Filed: Jan. 26, 2022

(65) Prior Publication Data

US 2022/0239109 A1 Jul. 28, 2022

(30) Foreign Application Priority Data

Jan. 26, 2021 (EP) ..................................... 21153547

(51) Int. Cl.
*H02J 3/38* (2006.01)
*H02J 3/48* (2006.01)

(52) U.S. Cl.
CPC ................ *H02J 3/381* (2013.01); *H02J 3/48* (2013.01); *H02J 2300/28* (2020.01)

(58) Field of Classification Search
USPC ................................................ 324/86, 76.11
See application file for complete search history.

(56) References Cited

U.S. PATENT DOCUMENTS

| | | | |
|---|---|---|---|
| 2009/0240382 A1 | 9/2009 | Mitani et al. | |
| 2011/0082654 A1 | 4/2011 | Dickens | |
| 2014/0350873 A1 | 11/2014 | Litzinger et al. | |
| 2015/0109836 A1* | 4/2015 | Hatakeyama | H02J 3/381 363/97 |
| 2016/0003879 A1 | 1/2016 | Wilson et al. | |
| 2019/0024634 A1* | 1/2019 | Tarnowski | F03D 7/0284 |
| 2020/0044455 A1 | 2/2020 | Brombach | |

FOREIGN PATENT DOCUMENTS

| | | |
|---|---|---|
| CA | 2 878 335 A1 | 1/2014 |
| CA | 3 088 831 A1 | 8/2019 |
| EP | 2 629 386 A1 | 8/2013 |
| WO | 2013/087122 A1 | 6/2013 |

* cited by examiner

Primary Examiner — Vincent Q Nguyen
(74) Attorney, Agent, or Firm — Seed IP Law Group LLP

(57) ABSTRACT

Provided is a method for monitoring a three-phase electricity supply grid. The grid has a topology with spatially distributed grid nodes. Grid nodes are in the form of observation nodes at each of which at least one voltage is acquired in terms of absolute value and phase. The method includes acquiring in each case at least one node voltage at each observation node, where each node voltage has is a node phase angle as phase angle of the node voltage, and each node phase angle describes a respective phase angle with respect to a reference phase angle of a voltage. The method includes ascertaining at least one phase angle relationship that describes a relationship between at least two of the node phase angles distributed over the grid topology, and checking the electricity supply grid for a grid disturbance on the basis of the at least one phase angle relationship.

19 Claims, 5 Drawing Sheets

METHOD FOR MONITORING AN ELECTRICITY SUPPLY GRID

BACKGROUND

Technical Field

The present invention relates to a method for monitoring a three-phase electricity supply grid. The invention also relates to a monitoring arrangement for monitoring a three-phase electricity supply grid.

Description of the Related Art

Electricity supply grids are known. They serve to provide electric power generated by generators to consumers for consumption. Such electricity supply grids may be highly complex, such as for example the European integrated grid. A section of such a grid may however also be considered to be an electricity supply grid and monitored, such as for example the German or French electricity supply grid as part of the European integrated grid, to stay with the example. Such electricity supply grids have spatially distributed generators and thus feeders, and spatially distributed consumers. Both the power generated and fed in by generators and the power consumed by consumers may fluctuate on an individual basis, even between 0% and 100%.

This may lead to highly variable load flows in the electricity supply grid, and this may lead to oscillations and even to instabilities.

Electricity supply grids are conventionally structured such that they contain a plurality of large generators, in particular large power plants having synchronous generators, which are coupled directly to the electricity supply grid and thereby feed electric power into it. In this conventional structure, the operators of the power plants are often also the operators of the electricity supply grid or of a considerable portion of the electricity supply grid. For control purposes, there are therefore appropriate control centers that primarily control the generators, that is to say said large power plants. Smaller consumers are in this case taken into consideration on a more statistical basis, with larger consumers possibly being taken into consideration specifically in terms of required power.

If unusual power fluctuations with unusual oscillations or even stability-critical situations occur, or other disturbances, then the control center is able to respond thereto. This is often performed by highly trained and experienced personnel in such a control center.

At least some electricity supply grids, or at least portions thereof, however develop into an electricity supply grid in which the portion of power fed in by renewable energy sources becomes ever greater. This in turn results in a wide variety of changes. Such renewable energy sources are in particular usually smaller but more widely distributed generators, have a fluctuating power, are sometimes connected by specific grid topologies and may respond in a highly individual manner to frequency and voltage changes in the electricity supply grid, specifically usually in a manner different from directly coupled synchronous generators.

This may also make it difficult for a control center to control the electricity supply grid as it did previously. It should in particular be highlighted that the electricity supply grid behaves differently than it did previously and that it is less possible to influence the electricity supply grid by controlling the large generators, in particular large power plants. By way of example, the stabilizing effect of directly coupled synchronous generators on the electricity supply grid decreases when its share decreases.

To address these problems, there are usually extensive grid connection rules that specify, for renewable energy sources, that is to say in particular wind power installations, wind farms and photovoltaic installations, how these have to behave in which situations. This includes in particular the behavior in the event of voltage changes, frequency changes and grid faults.

The problem of grid control however remains challenging, in any case in limit situations, and full use does not yet appear to have been made of the potential of jointly using renewable energy sources to control or at least observe the electricity supply grid.

The European Patent Office searched the following prior art in the priority application relating to the present application: US 2011/082654 A1, US 2009/240382 A1 and US 2016/003879 A1.

BRIEF SUMMARY

Provided are one or more techniques to improve the monitoring of an electricity supply grid, in particular using the potential possessed by renewable energy sources, at least wind power installations and/or wind farms. The intention is at least to propose an alternative solution to previously known solutions.

Provided is a method that relates to monitoring a three-phase electricity supply grid. The electricity supply grid has a grid topology with spatially distributed grid nodes, and a plurality of the grid nodes are in the form of observation nodes at each of which at least one voltage is able to be acquired in terms of absolute value and phase. The method comprises the following steps:

One step concerns acquiring in each case at least one node voltage at each observation node, such that a plurality of node voltages are acquired, wherein each node voltage is characterized by a node phase angle, as phase angle of the node voltage, and each node phase angle in each case describes a phase angle with respect to a reference phase angle of a voltage, such that a plurality of node phase angles distributed over the grid topology are present.

The underlying phase angle and the reference phase angle may revolve at the grid frequency, but the observed node phase angle does not revolve and forms a fixed value as long as the electricity supply grid does not change, that is to say operates in a stationary state. However, if dynamic deviations in the node phase angle occur, dynamic effects in the electricity supply grid may also be derived therefrom and thus identified.

The node phase angle may be averaged over a relatively long time. A relatively long time may be assumed to be a time interval between a quarter of a period length to two, three or in particular five period lengths of the grid frequency.

A plurality of node phase angles distributed over the grid topology are thus taken into consideration, and this is based in particular on the concept that a comprehensive image of this portion of the electricity supply grid or even of the entire electricity supply grid is able to be created from the large number of node voltages and node phase angles. The reference phase angle provides a uniform basis. All of the recorded node phase angles, which are thus distributed over the grid, are thereby able to be compared well.

The node phase angles do not however have to be explicitly acquired. It is also possible for them to be taken into consideration indirectly, for example by the times of the zero crossings of the respective node voltage. It is important to correlate the node phase angles, in each case at least some thereof. This may also be performed indirectly, that is to say without explicitly acquiring each individual node phase angle and specifying its magnitude. The acquired voltage signals of the node voltages may thus also be compared directly and a relationship between the phase angles may first be derived therefrom.

One step thus concerns ascertaining at least one phase angle relationship that in each case describes a relationship between at least two of the node phase angles distributed over the grid topology. It has been identified here that considering the phase angles on their own, that is to say their absolute values, is of only little relevance. A phase angle relationship may describe a difference between two phase angles of two observation nodes. If these two observation nodes—to take a simple example for illustrative purposes—are connected to a transmission line, then it is possible to derive a phase angle change along this transmission line from the difference between the two phase angles. This allows conclusions regarding the transmission line, but also regarding a current load flow via this transmission line. A load flow may also be referred to synonymously as power flow.

It may also involve propagating a change in the node phase angle from one observation node to the next observation node. A phase angle relationship may also describe more than two node phase angles. By way of example, the propagation, already mentioned by way of example, of a change in a node phase angle may be described by three or more observation nodes. If for example three observation nodes are connected to one another in a delta topology, the absolute changes in the phase angles between these three node phase angles may also be meaningful for this topology. This too is just an example, and it is also possible to correlate in this case even more nodes, that is to say four or more observation nodes, which may be connected to one another for example via a meshed structure.

One step concerns checking the electricity supply grid for a grid disturbance on the basis of the at least one phase angle relationship. It has in particular been identified here that a grid disturbance is able to be identified by observing the phase angle relationships. If for example a grid short circuit is present, then this leads to corresponding current flows, which may in turn influence the node phase angles. Expressed in illustrative terms, the node phase angles change more the closer they are to the short circuit location. This grid disturbance may thereby not only be identified, but also even located.

A grid disturbance may however also involve the isolation of a transmission line. This isolation may in particular take place between two observation nodes, and this may lead to the corresponding node phase angles changing quickly but otherwise independently of one another, to cite a further example.

There is usually a reason for isolating a grid portion, that is to say for example for isolating a transmission link between two observation nodes. This reason may in particular be present on one side of this isolation but not on the other. This may then also be able to be identified in the phase angle relationship.

According to one aspect, it is proposed to evaluate a temporal and spatial change in the node phase angles in order to check for the grid disturbance. Such a temporal or spatial change may be a phase angle relationship or be derived therefrom. This in particular involves identifying and evaluating a wave-shaped propagation of a phase angle change.

A temporal and spatial change in the node phase angles may for example mean that one node phase angle at a first observation node is increasing, one node phase angle at a second observation node is likewise increasing slightly later, and one node phase angle at a third observation node is increasing slightly later still. The amplitudes of the increase rate may in this case be different. It is thus possible to observe how a phase angle change propagates from the first observation node via the second observation node to the third observation node, to cite one simple example. Each node phase angle thus changes at its observation node over time, meaning that there is a temporal change in the node phase angles. The respective change furthermore however also varies from one observation node to the next, meaning that there is thereby a spatial change in the node phase angles.

Such a temporal and spatial change in the node phase angles may in particular allow a conclusion as to a correspondingly propagating grid disturbance, that is to say spatially propagating grid disturbance. It is thereby sometimes possible to identify the direction in which this grid disturbance is propagating and how it is accordingly able to be counteracted.

It is also possible to identify other propagations, for example the increase in a load flow, without this initially having to lead to a grid disturbance or even to a grid fault. The increase in a load flow may indicate that there is a supply deficiency at a location, for example a first transmission node. Less power is thus generated than consumed. This power deficiency may be rectified by supplying power, for example using power from an adjacent second observation node. This may then lead, at this second observation node, to a power deficit, and may lead to this power being provided for example by an adjacent third transmission node.

Any power deficit may be identified through a corresponding phase angle change, that is to say a change in the node phase angle of the observation node in question. In the same way as this power deficit propagates from one observation node to the next, a change in the node phase angle also continues to propagate. This may be identified, and further propagation of the power deficit may thereby possibly be counteracted.

It has moreover been identified, in a manner applicable in principle to all aspects, that a phase angle, and thus also its change, is able to be detected very quickly. It has in particular been identified that a phase angle is able to be acquired quickly and continuously when continuously monitoring a grid voltage.

It has also been identified that a phase angle is feasibly able to vary only between the values $-90°$ and $+90°$. Unlike for example in the case of the grid voltage, there is therefore no need for any normalization or conversion between different voltage levels. Phase angles are instead able to be compared directly.

According to one aspect, it is proposed for phase angles, in each case revolving at a frequency, of the node voltage to be acquired, and/or for an average frequency and/or an average frequency drift of the electricity supply grid or of a grid portion thereof to be acquired from the phase angles revolving at the frequency, and optionally for a power balance of the electricity supply grid or of the grid portion to be derived from the frequency drift.

By acquiring the revolving phase angles, these are however able to be used well to acquire node phase angles that do not revolve, specifically through comparison with a revolving reference phase angle. The revolving phase angles may however also be used well for other purposes, such as ascertaining a frequency or frequency drift. The frequency of the respective node voltage is in principle the derivative of its phase angles revolving at the frequency. Acquisition is thus easily possible.

Acquiring a frequency is known and is also well mastered, for example for wind power installations that feed into an electricity supply grid. However, it has been identified here that using the revolving phase angles of the node voltages makes it possible to acquire the frequency very quickly, and good filtering is still possible. This is achieved in that averaging may be performed on a large number of spatially distributed values. It is thus possible to take into consideration a large number of measured values, without a long measurement interval being required for this.

A frequency drift describes a change in the frequency, in particular over time. The frequency drift may likewise be acquired well through said acquisition of the frequency. A frequency drift may in particular also be referred to as change in the frequency by location. Using the spatially distributed and revolving phase angles readily allows such identification of the frequency drift.

It is also possible to identify a power balance from the frequency drift, in particular the change in the frequency over time. This is possible in a particularly fast manner and may be readily spatially delimited, since locally distributed and in the process spatially assigned values are used.

Although local acquisition, in particular local frequency acquisition and/or acquisition of a local power balance, is particularly readily possible here, it is however also readily possible to identify a global event, that is to say an event affecting the entire electricity supply grid. The described local acquisition is otherwise difficult, meaning that a solution is provided here.

According to one aspect, it is proposed for the grid disturbances to be assessed in terms of type of grid disturbance and/or amplitude on the basis of the at least one phase angle relationship. It has first of all been identified here that grid disturbances of different types may occur and may also be identified by the proposed method. Which type of grid disturbance is present may also be assessed, specifically identified, on the basis of the at least one phase angle relationship. By way of example, a topology changeover of the grid topology leads to a different ratio of the node phase angles to one another than when a cascaded split is present, to cite two types of grid disturbance by way of example. Details regarding different types of grid disturbance are described further below.

In addition or as an alternative, the amplitude of the grid disturbance may likewise be acquired or at least assessed on the basis of the at least one phase angle relationship. The amplitude in the case of a topology changeover may denote the magnitude of the resultant changes, that is to say whether, measured in terms of their power transmission capability, a large or small transmission line was isolated or connected. In the event of a grid oscillation, the amplitude may denote the amplitude of the oscillation. In the event of a cascaded split, the amplitude may identify how much power is disconnected per unit of time, to cite a further example.

According to one aspect, it is proposed for the grid disturbances for which a check is performed to be selected from the following types of grid disturbance. In the check or assessment of the grid disturbances by type of grid disturbance, it is accordingly checked whether one of the following types of grid disturbance is present. It may be proposed here to proceed only from these types of grid disturbance. When assessing the at least one phase angle relationship, it is thus checked what type of grid disturbance is most likely identified by the acquired at least one phase angle relationship, or what type of grid disturbance from the underlying types of grid disturbance is able to be best assigned to the at least one acquired phase angle relationship.

It has in particular been identified that it is possible to conclude as to a disturbance when some observation nodes experience a sudden change in voltage level. This is the case in particular when such a change in the voltage level propagates to an adjacent node and possibly propagates even further. There is thus a collective change in the voltage level, that is to say a collective change in the node phase angles.

It has been identified that the type of disturbance may be concluded from the type of collective change. In this respect, it has been identified that the type of disturbance, that is to say the type of grid disturbance, may be characteristic, that is to say may have a characteristic fingerprint.

One type of grid disturbance is a topology changeover, in which the grid topology is changed by at least one changeover. Such a topology changeover may be identified by the fact that there is a large change in the voltage angles, and thus the node phase angles or the node phase angle, at the breaking edge, that is to say where the changeover occurs.

A topology changeover may in particular involve transmission paths being changed. In this case, transmission paths are split, with new transmission paths possibly being created at other locations.

One grid disturbance is a grid split in which at least two grid portions are disconnected from one another. Such a grid split, which may also be referred to as a system split, is a situation in which two previously interacting portions of the electricity supply grid are split into two portions, specifically systems, operating separately from one another. The size of the transmission paths isolated in the process in terms of transmissible power may identify the amplitude of this grid disturbance.

At the location where the split is performed, which may also be referred to as breaking edge, there is a large change in the voltage angles and thus the node phase angles. This may be identified accordingly. There is also on average acceleration and braking of the frequency. It is in particular possible for acceleration of the frequency to occur on one side of the breaking edge and for braking of the frequency to occur on another side. This is then reflected accordingly by an increase or decrease in the node phase angles in question.

Furthermore, a wave may run through the grid or the disconnected grid portion away from the breaking edge, that is to say in each case in the direction of this grid portion. Such a wave may be referred to as wave of the phase angle change. The node phase angle thus first increases at the breaking edge, or decreases, and this increase or decrease then occurs slightly later at adjacent observation nodes that are no longer at the breaking edge, and slightly later still at observation nodes that are even further away. Such a system split may thereby be identified.

Moreover, a difference between system split and topology changeover may also be ascertained using the frequency, which is then different. In the case of the grid split, the frequencies of the disconnected grid portions specifically differ following the split.

One type of grid disturbance is a cascaded split, in which grid portions of the electricity supply grid are progressively disconnected from one another, generators potentially feeding into the electricity supply grid are disconnected from the electricity supply grid and/or consumers potentially drawing power from the electricity supply grid are disconnected from the electricity supply grid.

The disconnection of two grid portions from one another may correspond to a system split, but this involves such disconnection taking place progressively, that is to say one grid portion is disconnected from another and, in a next step, a further grid portion is disconnected, and possibly so on.

The cascaded split may thus also concern the disconnection of generators that are specifically progressively disconnected, in other words one generator after another. The cascaded split may likewise concern the disconnection of consumers from the electricity supply grid that likewise takes place progressively.

The problem in the case of the cascaded split is in particular that a first disconnection may take place as a protective measure, that is to say in order to avoid overloading the electricity supply grid or a portion thereof. Depending on the situation, it is then possible that the problem is not solved but rather exacerbated by the first disconnection. Accordingly, the next disconnection is then performed as the next protective measure, as a result of which the problem may then be exacerbated even further. In this sense, an increasing number of disconnections may be performed. This may concern the disconnection of grid portions, the disconnection of generators, that is to say feeders, and of consumers, either in each case only one of these three cases or a combination. An alternating disconnection of generators and consumers may for example lead to an upswing that is supposed to be prevented thereby, but is actually excited.

It has been identified that each disconnection, due to the changed local load flows, leads to a local jump in the voltage angle with an accompanying wave-shaped propagation. The node phase angle of the observation nodes in question thus jumps, and this change then propagates to the remaining grid portion. This cascaded split may thereby be identified.

If a plurality of grid sections, in particular containing generators and consumers, are split in a cascaded manner, then such an event may accordingly be observed multiple times, with a different origin of the wave. The first local jump in at least one node phase angle thus occurs upon each of these individual disconnections at different locations in the electricity supply grid, which is referred to here as origin of the wave, and propagates from there. This may be an indicator of an upcoming large disturbance.

A cascaded split of grid sections, generators and/or consumers is thus able to be identified early when such waves having different origins are observed. Such waves may be detected through comprehensive observation of a correspondingly large number of node phase angles at a correspondingly large number of observation nodes. The individual disconnection points are thereby even able to be located, and countermeasures are thereby able to be initiated in a targeted manner.

One type of grid disturbance is failure of at least one power transmission path on which power was being transmitted between at least two grid nodes prior to the failure, in particular between at least two observation nodes. If for example one of two parallel lines fails, the remaining line experiences an increase in the voltage angle difference, that is to say an increase in the angle difference between the two node phase angles of the observation nodes between which this line is arranged. Such failure of a power transmission path may thereby be identified.

Other line failures that influence a local grid impedance are also identified by changing voltage vectors, in particular jumping voltage vectors. Such a voltage vector may represent the node phase angle or even the difference between two node phase angles. It is thus in particular proposed to check the difference between two node phase angles that specifically form a phase angle relationship. If a jump occurs here, failure of at least one power transmission path may be assumed.

It has in particular also been identified here that very poor grid conditions may be identified through a large difference between node phase angles. Such poor grid conditions are present when a correspondingly large number of power transmission paths have failed without a complete disconnection however yet having taken place. Such a disconnection is however impending when a very poor grid condition has been identified. A poor grid condition may also mean that an impedance has become large.

A further type of grid disturbance is a grid short circuit in which at least one short circuit occurs between two phases of the electricity supply grid or at least between a phase of the electricity supply grid and ground. Such a grid short circuit may lead to corresponding short-circuit currents to the short circuit, which lead to corresponding phase angle differences on line impedances that supply such a short-circuit current. The voltage additionally breaks down the closer the corresponding grid node, that is to say observation node, is to the short circuit. A corresponding change in the node phase angles from one to the next observation node toward the location of the short circuit may thus be observed. Such a grid short circuit may be derived therefrom.

One type of grid disturbance is a power oscillation in which the power oscillates between grid portions of the electricity supply grid. In a manner similar to the power that in this case flows in and out of the grid and fluctuates alternately between the grid portions at least in terms of its magnitude, it is also possible to identify corresponding waves at the node phase angles. A power oscillation may be classified as a disturbance in particular when it becomes too large. A periodic load flow variation may be assessed as criterion.

According to one aspect, it is proposed, in order to check for a power oscillation, for the presence of a periodic load flow variation to be checked on the basis of the at least one phase angle relationship, wherein a periodic load flow variation describes a periodically repeating variation of a power flow, and the load flow describes a power flow between at least two grid portions and/or on a high-voltage transmission line, wherein a power oscillation is assumed when a value of a periodic load flow variation that lies above a predefinable variation reference value has been identified. The variation reference value is in particular at least 2%, at least 5%, in particular at least 10%.

The periodically repeating variation is in particular in the range from 0.1 to 2 Hz, in particular in the range from 0.2 to 1 Hz.

Such power oscillations are known in principle and sometimes difficult to identify, because they initially do not trigger any hard effects in the grid. They could be identified on small voltage changes or frequency changes; such changes may however also be caused by other states or situations in the electricity supply grid. By investigating at least one phase angle relationship, in particular its change, and in particular when a very large number of phase angle relationships are considered, it is possible to identify a load flow variation. In particular when observing phase angle relationships distributed over the electricity supply grid, it is also possible to identify a wave-shaped, in particular oscillating change therein, which is in turn suitable for identifying a load flow variation. This may in turn be used to conclude as to the power oscillation.

If there are power oscillations in an electricity supply grid, then this may be revealed by the fact that these run through the grid in a manner comparable to waves and shift the voltage angle at the grid nodes that they run through. They thus shift the node phase angles at the observation nodes. This results in temporarily different load flows that make it possible to conclude as to a power oscillation. The change in the load flows may be identified through the change in the phase angle relationships.

The identification in particular involves acquiring these load flow variations. To this end, the node phase angles at a plurality of observation nodes may be evaluated over a relatively short time interval. Such a relatively short time interval refers in particular to the time interval over which such grid oscillations occur or may even build up. The time interval may in particular be in the region of a few minutes, in particular in the range from 10 to 30 seconds, in particular in the range from 30 to 120 seconds.

The change in the phase angle relationship may thus be used to identify respective load flow variations, and this makes it possible to conclude as to power oscillations.

According to one aspect, it is proposed, in order to check for a grid split, to check for the presence of a node phase wave, wherein a node phase wave describes a change in a node phase angle that propagates from at least one of the observation nodes to other observation nodes. The node phase angle thus for example increases, in particular continuously, at an observation node, and an increase in a node phase angle is identified slightly later in at least one adjacent observation node and slightly later still at another observation node, and so on. The same may of course also occur and be identified for the decrease in a node phase angle. Such a node phase wave may also be illustratively described as being like how dominoes fall down.

A domino, which is representative of the phase angle at an observation node, falls down and in the process hits the next domino, which is representative of a phase angle of an adjacent observation node. This domino then hits another one, and so on. However, it is also possible, also in a manner represented using dominoes, for a domino to directly hit two or more dominoes, and these then in turn for their part each hit a plurality of dominoes. The wave then thus propagates not only in one dimension, but rather propagates in two dimensions. The propagation then thus takes place, to use another metaphor, like a wave on an ocean into which a pebble has been thrown. Since a check is performed for a grid split here, this however corresponds more to the situation of said pebble being thrown into the ocean at the edge of the ocean.

It is then proposed for a grid split to be assumed when the following changes are identified. A change in a node phase angle, in particular a jump in the node phase angle, is first identified at a first observation node by a value that has at least one predefinable first change reference angle in terms of absolute value. Then, a propagation time later, a change in a node phase angle, in particular a jump in the node phase angle, is identified at at least one second observation node by a value that has at least one predefinable second change reference angle in terms of absolute value. In order to check for a grid split, a node phase angle at a first observation node and at least one second observation node are thus checked for changes. Reference values are taken as a basis for both changes, and it is furthermore checked whether the changes occur with a time offset. The reference values rule out an incorrect conclusion being made in the case of very small changes and even in the case of changes to be attributed only to measurement inaccuracies.

The basis that is taken is in particular that the second change reference angle is smaller than the first change reference angle and is at least 15°, in particular at least 30° and/or that the propagation time is in the range from 200 ms to 1000 ms.

It has in particular been identified that, in the case of such a node phase wave, the amplitude decreases as distance from the origin increases, meaning that the change reference angle is selected to be greatest for the first observation node. It should be noted that 5° or even 10° for the second change reference angle means that the first change reference angle is even greater, and such values for a change in a node phase angle are thus very large values. Provision is in particular made for a check to be performed for a node phase jump, and a node phase jump by 15° or 30° is a very large jump.

It has thus in particular been identified that the grid split causes a node phase angle to change, in particular jump. A jump is in particular present for a change that takes place substantially within 200 ms.

It has been identified that the propagation of such a node phase wave over the electricity supply grid or the relevant grid portion may be in the region of a few seconds. The propagation time, which concerns the time of the propagation from one observation node to a next observation node, is therefore preferably selected to be in the range from 20 ms to 100 ms.

However, far more than only two observation nodes are preferably used in order to identify a node phase wave. A check may in particular additionally be performed as to whether a change in a node phase angle, in particular a jump in the node phase angle, has been identified at at least one third observation node in a manner temporally offset by a propagation time. It is checked whether this is temporally offset from the at least one second observation node, and whether the jump was identified by a value that has at least one predefinable third change reference angle in terms of absolute value.

For the sake of simplicity, the third change reference angle may be selected to be the same size as the second change reference angle, or slightly smaller. The node phase angles at at least a fourth, fifth and sixth observation node may also be checked in this way, wherein a propagation time from one to the next observation node is checked in each case.

According to one aspect, it is proposed, in order to check for a cascaded split, to check for the presence of multiple voltage jumps, wherein each voltage jump occurs as a node phase angle jump in a node phase angle at an observation node with respect to a node phase angle at another observation node, and at least three phase angle jumps are observed. A cascaded split is assumed when each of the node jumps has a node phase angle change of at least a predefinable reference angle change, and there is a time difference between two respective node phase jumps. This time difference may be referred to as jump difference and is in the range from 100 ms to 10 seconds. The magnitude of the jump is at least 0.5°, in particular at least 2°.

It is thus possible to observe at least three phase angle jumps that occur in a time sequence and that thus make it possible to conclude as to the cascaded split.

According to one aspect, it is proposed, in order to check for a failure of lines, to check for the presence of an increased node phase angle difference between node phase angles of two observation nodes, wherein an increased node phase angle difference and thus at least a failure of a line is assumed when an acquired node phase angle difference lies at least a predetermined offset angle above an average node phase angle difference for these two observation nodes in terms of absolute value. This is based on the finding that a node phase angle difference in the form of a difference between two node phase angles, specifically at two observation nodes, is in principle entirely normal and only the change thereof, specifically when it is large enough, indicates a failure of lines, that is to say a failure of at least one line.

This is basically based on the following observation, which is also relevant to the other cases. Preferably, a very large number of observation nodes are observed and thus a very large number of node phase angles are acquired, in particular 50 or more. If for example two observation nodes in the electricity supply grid or the grid portion under consideration are far away from one another, such that a meshed grid gives a large number of theoretical transmission paths between these two nodes, the failure of a line will barely influence the node phase angle difference between these two observation nodes. Through a comprehensive observation of as many observation nodes as possible or their node phase angles, that pair in which the line in question, which has now failed, is arranged directly between the two observation nodes is however also observed. This then results in an increased node phase angle difference. And the failure of this line may thereby be identified. In other words, as many node phase angle differences as possible are monitored and each is checked as to whether it has increased significantly.

It is in particular proposed for the offset angle to have a value of at least 3°, in particular of at least 5°, and/or for the offset angle to be at least 25%, in particular 35% of the node phase angle difference following the increase. An increase by 3° or even 5° is a comparatively large increase and therefore indicates a significant value, which makes it possible to conclude as to a failure of a line. Such values may turn out to be different depending on the situation and depending on the specific grid topology, but a value of at least 3°, in particular at least 5°, may serve as a good test threshold.

The increase in the node phase angle difference may however also depend on the magnitude of the node phase angle difference and it is therefore proposed, according to one alternative, which may however comprise the absolute numbers, for the offset angle to be at least 25%, in particular at least 35% of the average node phase angle difference. This is also a significant value to which the increase should be present before a failure of a line is derived.

According to one aspect, it is proposed for the at least one grid disturbance in the grid topology to be located on the basis of the at least one node phase angle relationship. Some examples in this regard have already been given above, according to which, in particular in the case of a wavy propagation, the origin of the wave is able to be identified and the grid disturbance may be located there.

In the case of a failure of lines, the grid disturbance, specifically this failure, may be located where the increased node phase angle difference occurs. It occurs in the form of a difference between two observation nodes, and the grid disturbance may then also be located between these observation nodes.

According to one aspect, it is proposed for a grid stability of the electricity supply grid to be assessed on the basis of the at least one detected grid disturbance, wherein the assessment takes place on the basis of at least one detected disturbance property of the grid disturbance. Possible disturbance properties of the grid disturbance may be taken from the following list of properties.

One possible disturbance property of the grid disturbance is a detected location of the grid disturbance. Options for detecting a location of the grid disturbance, that is to say for locating a grid disturbance in the grid topology, have already been described above. The location of a grid disturbance may already be important for countering this grid disturbance, because some countermeasures may often also be relevant in the vicinity of the location. Even some underlying faults may be located there and may accordingly be found there and possibly rectified.

One possible disturbance property of the grid disturbance is a type of grid disturbance. These include in particular the types of grid disturbance that have already been given above. If the type of grid disturbance is known, it is also possible to respond thereto in a targeted manner, including counteracting further propagation.

One possible disturbance property of the grid disturbance is an amplitude of the detected grid disturbance. Such amplitudes, and what may be understood to be an amplitude in the case of grid disturbances, have already been explained above. An amplitude of the detected grid disturbance may also be referred to synonymously as a magnitude of the detected grid disturbance.

It is then proposed for the grid stability to be assessed on the basis of at least one of these possible disturbance properties of the grid disturbance. This is in particular understood to mean here whether grid stability is present, jeopardized or not present. If grid stability is jeopardized, an attempt may be made to counteract the disturbances and/or to increase stability in another way. If for example the outage or the failure of a power transmission path has been established as disturbance and also located, an attempt may be made to re-establish this power transmission path.

However, if this is not possible, it may be the case that stability is jeopardized, because the power that is no longer able to be transmitted via this failed or disconnected power transmission path is transmitted via other paths, which may in turn thereby be brought to their power limits. Stability is thereby jeopardized because safety deactivations may occur. Such safety deactivations may lead to even fewer power transmission paths and thus even less transmission capacity being available. Even more power is thus redistributed, and further safety deactivations may thereby occur. In the worst-case scenario, this then results in a chain reaction as far as a blackout.

If, to stay with this example, the power transmission path is thus not able to be re-established, or not able to be re-established quickly enough, instead, in order to improve stability, a power infeed may be reduced and a power consumption by consumers may possibly also be reduced. This makes it possible to achieve a situation whereby less power actually has to be transmitted, which thus no longer brings the remaining power transmission paths to a dangerous limit.

This example also shows at least one advantage of the disclosure, specifically that monitoring the node phase angles at the observation nodes, that is to say as far as possible at a large number of observation nodes, makes it possible to identify a grid disturbance, to locate it and to be able to initiate countermeasures. A method that is on the whole able to be automated is in particular thereby also possible. Wind power installations or wind farms, and the same is also partially true for photovoltaic installations, are thus in particular able to identify and locate such a grid disturbance and also immediately implement said power reduction of the infeed by reducing their own fed-in power.

It should also be highlighted here that wind power installations are able to respond very quickly to be able to perform such a power reduction very quickly in any case. An ad-hoc reduction in the power infeed is possible almost without any delay, of the order of magnitude of 10 to 50 ms. A continuous reduction even in power generation is possible in a few seconds, for example in 3 seconds or 5 seconds. A further aspect is that wind power installations may be distributed widely over the electricity supply grid, that is to say that interventions may thereby also be made in a spatially targeted manner. A spatially selective measure is thus also possible, that is to say for example to reduce the power in a targeted region. With reference to the cited example, specifically in exactly that region from which the power would have to be transported via the failed power transmission path.

However, other measures are also possible, such as for example providing a short-circuit current in a targeted manner. Such a measure may be used to trip circuit breakers that trip on the basis of a current magnitude in a targeted manner and thereby to trip an appropriate switching operation.

It is also readily possible to initiate measures against grid oscillations, which may also be referred to as power oscillations, because in any case wind power installations are able to increase and reduce their power infeed quickly and in a temporally precise manner in order to feed in power as it were in the opposing cycle, to put it simply and illustratively. In this case too, the spatial distribution of wind power installations in the grid may advantageously be used to increase or to reduce the power infeed precisely where this is necessary. It is pointed out as a precautionary measure that such power oscillations occur at a frequency of the order of magnitude of a few seconds. The affected wind power installations, if they are intended to counteract this, would thus have to increase or reduce their power for a few seconds. Due to the large amount of kinetic energy in the rotating rotor of each wind power installation, it is possible to perform such a power increase.

It has in particular also been identified that both oscillations and locally very poor grid conditions may jeopardize overall stability. Identifying cascaded deactivations or other cascaded switching operations may also be a sign that a stability limit has been reached.

One problem may be poor grid conditions. This may be identified immediately by evaluating the maximum voltage angle difference at specific grid nodes. The maximum voltage angle difference is thus the maximum value that may occur for a phase angle difference. The specific grid nodes may each be observation nodes, particularly observation nodes at which large phase angle differences occur with respect to an adjacent observation node.

Locations with poor grid conditions may thereby be known. Decreases, that is to say reductions in the fed-in power and possibly also in the consumed power, or other stabilization measures may possibly be activated when needed in order to prevent a loss of stability. If there are very large differences, that is to say very large phase angle differences, topological changeovers may prevent instability. It is thus possible here for either a section threatening to become unstable to be disconnected or for the overall stability to be increased by the topological changeover.

A dynamic stability may also be problematic or expedient to observe. If, in the case of large power transmissions that are able to be identified by large phase angle differences, there are additionally oscillations (that is to say grid oscillations or power oscillations) or other overlaid dynamic effects, an electricity supply grid or grid portion may approach the dynamic stability limit. Such a dynamic stability limit is the limit at which a grid "rotates" by 90°. If differences between the node phase angles from one location in the electricity supply grid to another location in the electricity supply grid thus differ by +/−90°, that is to say 180° or more, such a dynamic stability limit is reached or exceeded.

In this respect, there is thus a dynamic stability or a dynamic change, which in particular cannot be attributed to a specific topology, in which there are in particular overloads of individual power transmission paths. Instead, a fault-free or disturbance-free grid topology may be present, but dynamic effects such as oscillations may still bring the grid to a stability limit. Oscillations may be attributed to properties of the electricity supply grid, such as for example in particular to connected generators, but they may possibly be excited only by a procedure, such as for example the deactivation of a large consumer.

Targeted attenuation measures or topological changeovers or decreases, that is to say reductions in the power infeed, may become necessary. Attenuation measures have already been described above. They concern in particular a frequency-dependent power infeed, specifically power change, and a voltage-dependent reactive power infeed or reactive power change.

Although the reason for reaching a dynamic stability limit does not have to be an inappropriate topology, a topological changeover may still solve the problem. To stay with the example of the oscillation, the topological changeover may interrupt the course of the oscillation and the oscillation may thus be interrupted.

A power decrease may also for example be helpful if for example it fully or partially compensates for the triggering event in which a consumer was deactivated.

According to one aspect, it is thus proposed for a stabilization measure to be performed on the basis of the at least one detected grid disturbance and/or on the basis of the assessment of the grid stability. Examples of this have already been given above. Stabilization measures may also be performed when only a grid disturbance has been detected, without a low grid stability already having been established.

One of the following stabilization measures may in particular be performed.

One possible stabilization measure is opening or closing at least one circuit breaker of the electricity supply grid. This may change a topology. By way of example, grid portions that are jeopardized thereby may be disconnected, or grid portions may be connected if they were disconnected and it is advantageous to reconnect them. Such reconnection may be particularly advantageous when one grid portion currently has a power excess, while the other grid portion currently has a high power demand.

One possible stabilization measure is disconnecting or connecting a generator. Particularly when there is a power excess, which may possibly likewise only be present locally, disconnecting a generator may be expedient. Conversely, connecting a generator when there is an increased power demand may be expedient.

Provision is accordingly made, as one possible stabilization measure, to disconnect or to connect a consumer. This measure has the same effect, specifically such that a consumer is able to be connected in the case of a power excess and a consumer is able to be disconnected in the case of a power insufficiency, that is to say an increased demand for power.

The disconnection or connection of a generator and the disconnection or connection of a consumer may also be coordinated or be combined depending on the grid disturbance. One example has already been cited above, according to which the disconnection of a generator and the disconnection of a consumer may be expedient in the case of overloaded power transmission paths in order thereby to reduce power transmission.

The connection of a generator, and the same applies for a consumer, may be expedient even without a power infeed or draw as a precautionary measure, in order to ensure that power is able to be fed in by the connected generator in the case of a sudden demand, or power is able to be consumed by the consumer. It is also possible for the generator, possibly even the consumer, to perform a pure reactive power infeed or draw and thereby to act in a manner similar to a phase shifter. A voltage regulation may thereby be performed.

One possible stabilization measure is that of specifying and implementing a change in fed-in active power. This specification may however be such that appropriate specification values or change values are given to various generators as setpoint values. These generators then implement the change in the fed-in active power. It is possible to achieve effects here that are similar to in the case of disconnecting or connecting a generator. Specifying a change may however also make it possible, this likewise being proposed as advantageous, to specify the type of change. By way of example, it may be specified that the fed-in active power is increased or is reduced with an increasing ramp. By way of example, it may be specified that the fed-in active power is raised by 50% in 10 seconds or is lowered by 50% in 10 seconds, and this may in each case be with reference to a nominal power.

One possible stabilization measure is that of specifying a change in fed-in reactive power. In this case too, the reactive power may be changed via a change function. In this case too, a change via a temporal ramp is in particular possible, both for the increase and for the decrease. Changing the fed-in reactive power in particular makes it possible to control a voltage. The targeted change via a change function, in particular via a temporal ramp, prevents a voltage jump and thus also a possible overreaction of the electricity supply grid.

Of course, the node phase angles may also be used to monitor such a change in the fed-in active power and/or the fed-in reactive power, in particular monitor it in terms of its effect.

One possible stabilization measure is that of implementing or setting an attenuation measure, in which a frequency-dependent power regulation and/or a voltage-dependent reactive power regulation is set in each case in terms of its transmission behavior, in particular in terms of its gain factor.

If the frequency increases, then it may be expedient, as a countermeasure, to reduce the fed-in power. A frequency increase may be an indicator of a power excess. If however the proposed power reduction is performed too quickly and/or to too great an extent, then this may result in a power insufficiency. The frequency then continues to drop, which may then in turn cause a power increase as countermeasure. Whether such an indicated upswing results depends on the gain of this frequency-dependent power regulation. It may also depend on a dead band that specifically specifies a frequency range within which no frequency-dependent power change is intended to be performed. If the gain is thus selected to be small enough, the upswing does not occur, but rather this may lead to appropriate attenuation. If the gain factor is selected to be too small, the proposed measure possibly does not exert its effect or does not exert it sufficiently or does not exert it quickly enough.

In a very similar manner, provision may be made for voltage-dependent reactive power regulation. If the voltage increases, this may be counteracted through a reactive power draw. In this case too, this should not be performed too quickly or to too great an extent, but also not too slowly or to too small an extent.

It is also in particular possible here for appropriate grid properties, that is to say the dynamic range of the electricity supply grid in the described respect, to be acquired beforehand, possibly acquired for different cases, and for appropriate attenuation measures to be preset. These may then be implemented or then activated as stabilization measure. Implementing or setting an attenuation measure of course also means reissuing or resetting same.

According to one aspect, it is proposed for at least one, in particular at least 50%, preferably at least 80%, of the node voltages and node phase angles to be acquired in each case by way of a wind power installation or wind farm connected to the electricity supply grid at the respective observation node.

This is based in particular on the finding that wind power installations or wind farms may be set up in a manner distributed widely over an electricity supply grid. For feeding in, they usually acquire the voltage at the grid connection point, or an equivalent voltage, in terms of absolute value and phase in any case. These wind power installations or wind farms thus already provide a very large number of potential measurement arrangements. These may be used. In addition, many wind power installations and wind farms are also linked to one another in terms of data transmission and are able to be controlled jointly. It has thus been identified to use this potential.

The acquisition of the voltage at the grid connection point in terms of absolute value and phase is now supplemented such that the acquired phase, that is to say the acquired phase angle, is considered with respect to a reference phase angle. In the simplest case, an accurate time signal may be specified for this purpose for all observation points, at which time the reference phase angle has the value zero. Each wind power installation or other measurement apparatus may allow a reference phase angle to revolve alongside it based thereon and correlate the acquired phase angle therewith. The result is the node phase angle of the corresponding observation node. While the acquired phase angle and the reference phase angle revolve at the grid frequency, the node phase angle describes the difference between these two revolving angles, such that the node phase angle itself does not revolve and essentially has a constant value, unless changes or transient processes arise in the electricity supply grid.

Expanded with this consideration of a reference phase angle, the large number of wind power installations and wind farms that are present may thus deliver a node phase angle for the respective observation node. The respective observation node may in particular be the grid connection point.

It is thus proposed, in the ideal case, for wind power installations and wind farms to record all node voltages. It is at least advantageous for a high proportion of for example at least 50% or at least 80% of all observation nodes, and thus node voltages and node phase angles, to be recorded by wind power installations or wind farms. Although this is technically not absolutely necessary, it has the effect that it is possible to use existing measuring technology and existing communication infrastructure in order also to be able to perform a comprehensive evaluation of the electricity supply grid with little cost outlay. The reliability of the recording of measurements by wind power installations or wind farms is also usually guaranteed.

In addition or as an alternative, such a comprehensive grid of wind power installations and wind farms may also be used to perform stabilization measures. In particular when they already record the node phase angles and provide them in a communication structure, they are also able to be controlled thereby.

Plus, a large number of stabilization measures may consist in briefly increasing or reducing an active power and/or increasing and reducing a reactive power and/or briefly providing a short-circuit current. All such stabilization measures are able to be performed very quickly and very reliably by wind power installations and wind farms. The fact that this is usually able to be performed in a very reliable manner is often ensured in that this functionality in principle may be a connection condition that has to be met if the wind power installation or the wind farm is to be connected to the electricity supply grid.

Even in the event that the wind power installations or wind farms are not supposed to record the node phase angles or to record only some of them, they may still provide stabilization measures. As already addressed above, they also have the advantage that they are distributed over a wide area and are thereby also able to provide stabilization measures in a spatially targeted and selective manner.

According to one aspect, it is proposed for the method to use at least 50 observation nodes, at each of which a node phase angle is acquired and used for monitoring. It has in particular been identified here that a very large number of observation nodes allows the possibility of comprehensive monitoring of the electricity supply grid or of the grid portion in question. It may be expensive to equip 50 observation nodes or more with an appropriate measurement sensor system, which thus goes against such a suggestion. However, in particular when using wind power installations or wind farms, which already have all this measurement technology, this outlay does not arise. At most a software adaptation appears to be necessary in order to provide the reference phase angle.

This makes it possible to provide a very large number of such observation nodes or node phase angles corresponding thereto for evaluation. It is also possible to use at least 100 or at least 500 observation nodes. It has in particular been identified here that, especially when using wind power installations or wind farms, a very large extensive grid of required measurement technology is sometimes already available for this task, and often even already communicates among itself, and this large grid is able to guarantee such comprehensive monitoring with the large number of observation nodes and thus be used for highly advantageous extensive monitoring. The observation of propagating waves from changes in the node phase angles or node phase angle differences is thereby in particular able to be performed very well and expediently.

A monitoring arrangement for monitoring a three-phase electricity supply grid is also proposed, wherein:
the electricity supply grid has a grid topology with spatially distributed grid nodes, and
a plurality of the grid nodes are in the form of observation nodes at each of which at least one voltage is able to be acquired in terms of absolute value and phase, comprising:

a respective acquisition apparatus for each observation node, configured to acquire in each case at least one node voltage at the respective observation node, such that a plurality of node voltages are acquired, wherein
each node voltage is characterized by a node phase angle, as phase angle of the node voltage, and
each node phase angle describes a respective phase angle with respect to a reference phase angle of a voltage, such that
a plurality of node phase angles distributed over the grid topology are present, an evaluation apparatus, configured to ascertain at least one phase angle relationship that in each case describes a relationship between at least two of the node phase angles distributed over the grid topology, and
a checking apparatus, configured to check the electricity supply grid for a grid disturbance on the basis of the at least one phase angle relationship.

Each acquisition apparatus, e.g. voltmeter, multimeter, voltage sensor, probe or clamp, thus has a voltage sensor that is suitable for recording a voltage in terms of absolute value and phase. It is also possible to take into consideration a reference phase angle in order to correlate the phase angle therewith and to generate a node phase angle. An appropriate evaluation processor may be provided for this purpose. This may receive the reference phase angle, or generate it itself. For this purpose, it may in particular receive an accurate time signal in order thereby to synchronize with the other acquisition apparatuses in the monitoring arrangement. However, it is not absolutely necessary to explicitly acquire the node phase angle that characterizes the respective node voltage. The node phase angles may be acquired in order to investigate relationships between them, but the relationships may also be ascertained in another way.

The evaluation apparatus (circuitry) may ascertain a phase angle relationship. This may be from acquired node phase angles, or in another way, such as for example via a direct comparison between the node voltages.

The evaluation apparatus may be arranged at a central location and for example be connected to all of the acquisition apparatuses via a communication infrastructure. In this case, consideration is given to individual data transmission paths between the evaluation apparatus and each acquisition apparatus. What is known as a SCADA system may also be used here.

The checking apparatus may be arranged locally in the evaluation apparatus and have a process computer or be implemented in a process computer. The checking apparatus may for this purpose receive all phase angle relationships from the evaluation apparatus and check the electricity supply grid for a grid disturbance on the basis thereof.

The monitoring arrangement is in particular configured to carry out a method according to at least one of the embodiments described above. To this end, parts of the method may be implemented in the acquisition apparatuses, the evaluation apparatus and the checking apparatus. The way in which the node phase angles are acquired may in particular be implemented in the acquisition apparatus, the ascertainment of the phase angle relationships may be implemented in the evaluation apparatus and the other steps, in particular the checking of the electricity supply grid for a grid disturbance, may be implemented in the checking apparatus.

According to one aspect, it is proposed for one, several or all of the acquisition apparatuses to be implemented in a wind power installation or a wind farm, and/or for one, several or all of the observation nodes to be in the form of grid connection points, via which a respective generator, in particular a respective wind power installation or wind farm, is able to feed into the electricity supply grid.

The wind power installations or wind farms may thereby easily acquire the node voltage and also the node phase angles. This may in particular be performed at a respective grid connection point. In addition or as an alternative, the wind power installation or the wind farm may implement respective stabilization measures via this grid connection point.

BRIEF DESCRIPTION OF THE SEVERAL VIEWS OF THE DRAWINGS

The disclosure is explained by way of example in more detail below on the basis of exemplary embodiments with reference to the accompanying figures.

DETAILED DESCRIPTION

Figure 1:
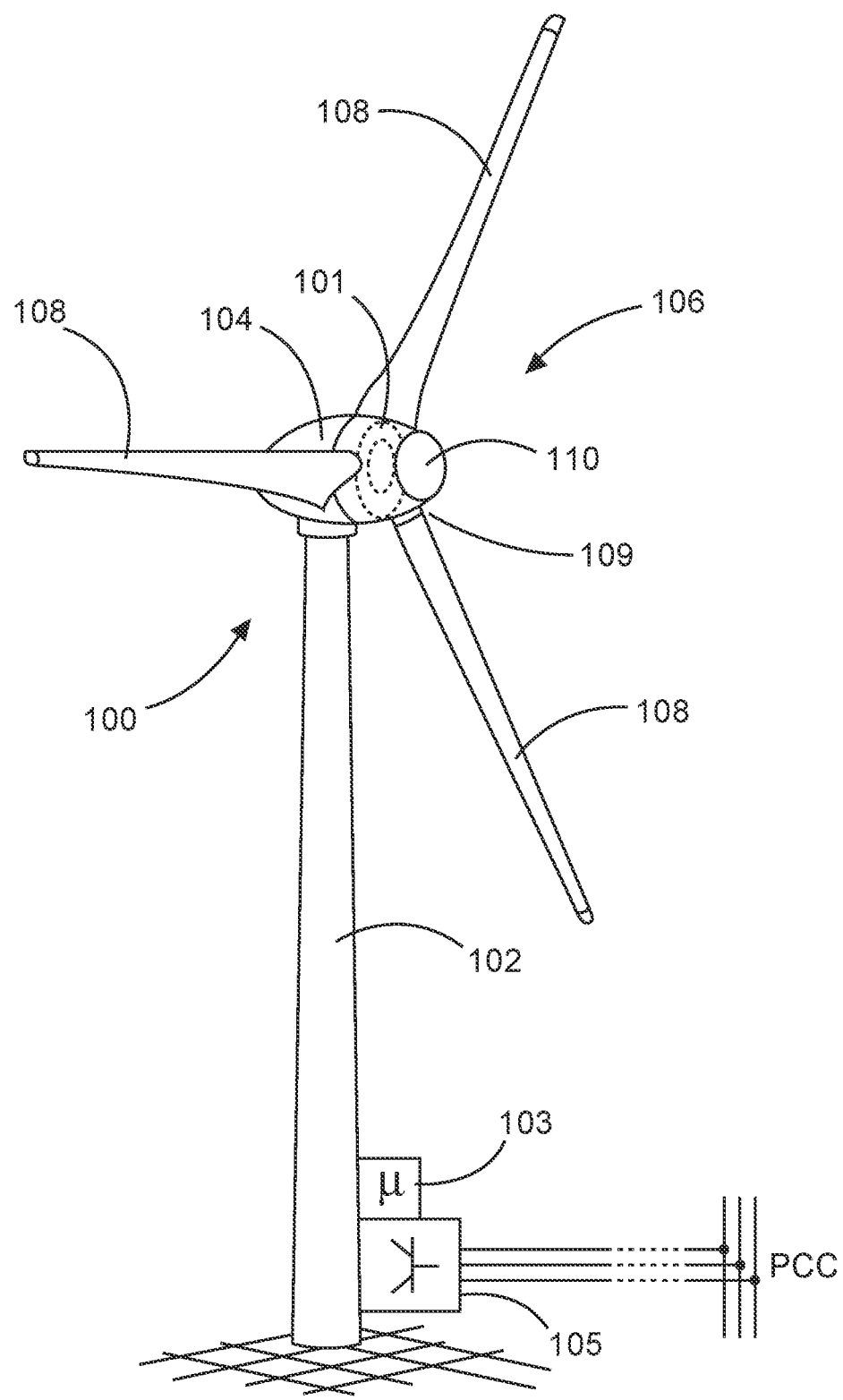
FIG. 1 shows a perspective illustration of a wind power installation.

FIG. 1 shows a schematic illustration of a wind power installation according to the disclosure. The wind power installation 100 has a tower 102 and a nacelle 104 on the tower 102. An aerodynamic rotor 106 having three rotor blades 108 and having a spinner 110 is provided on the nacelle 104. During the operation of the wind power installation, the aerodynamic rotor 106 is set in rotational motion by the wind and thereby also rotates an electrodynamic rotor or armature of a generator, which is coupled directly or indirectly to the aerodynamic rotor 106. The electric generator is arranged in the nacelle 104 and generates electrical energy. The pitch angles of the rotor blades 108 may be varied by pitch motors at the rotor blade roots 109 of the respective rotor blades 108.

The wind power installation 100 in this case has an electric generator 101, which is indicated in the nacelle 104. Electric power is able to be generated by way of the generator 101. Provision is made for an infeed unit 105, which may be designed in particular as an inverter, to feed in electric power. It is thus possible to generate a three-phase infeed current and/or a three-phase infeed voltage in terms of amplitude, frequency and phase, for infeed at a grid connection point PCC. This may be performed directly or else together with other wind power installations in a wind farm. Provision is made for an installation control system 103 for controlling the wind power installation 100 and also the infeed unit 105. The installation control system 103 may also receive predefined values from an external source, in particular from a central farm computer. The infeed unit 105 may form or comprise an acquisition apparatus.

Figure 2:
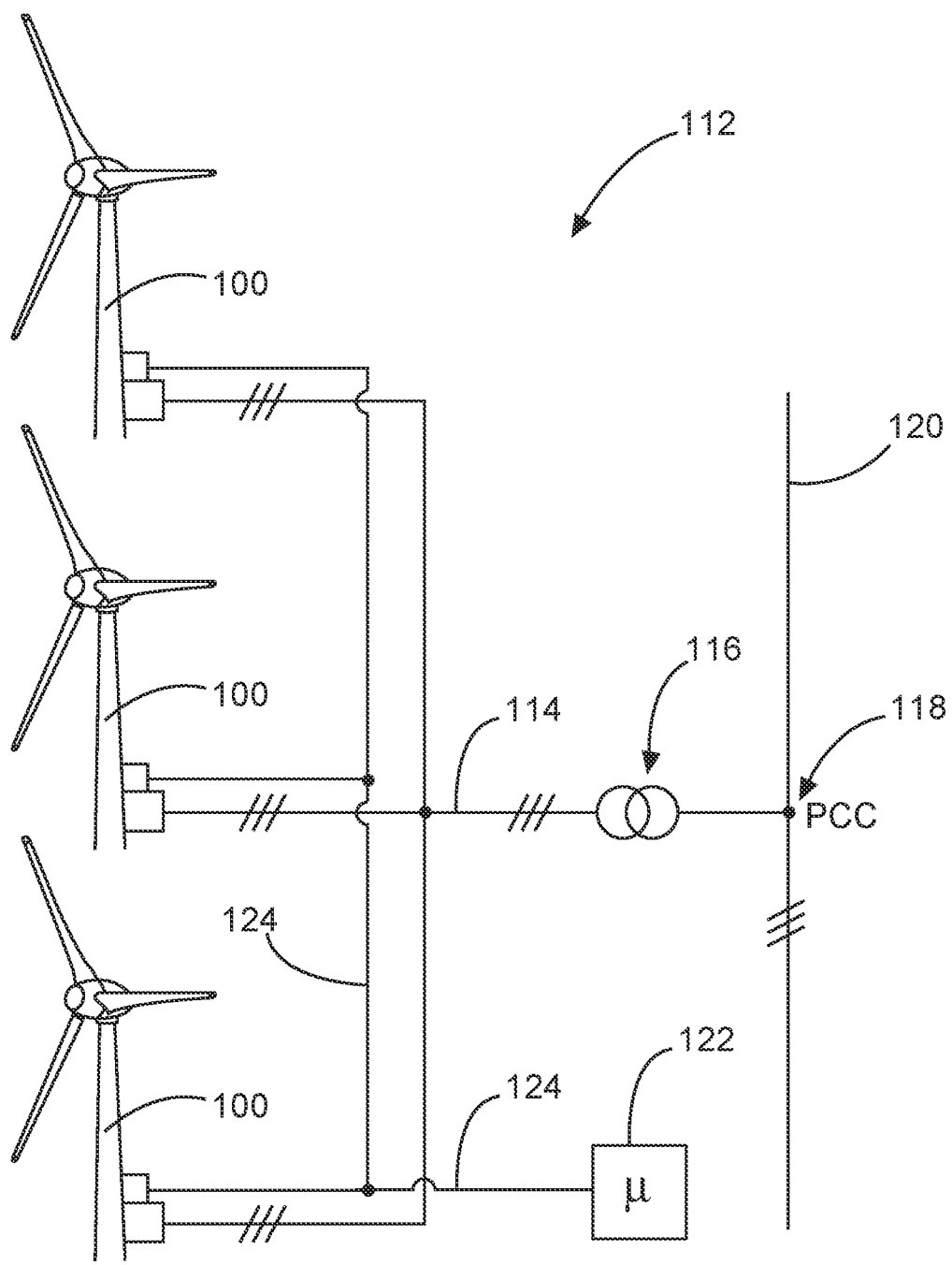
FIG. 2 shows a schematic illustration of a wind farm.

FIG. 2 shows a wind farm 112 having, by way of example, three wind power installations 100, which may be identical or different. The three wind power installations 100 are thus representative of basically any desired number of wind power installations of a wind farm 112. The wind power installations 100 provide their power, specifically in particular the generated current, via an electrical farm grid 114. In this case, the respectively generated currents or powers of the individual wind power installations 100 are added and a transformer 116 is usually provided, which steps up the voltage in the farm in order to then feed into the supply grid 120 at the infeed point 118, which is also generally referred to as PCC. FIG. 2 is only a simplified illustration of a wind farm 112, which does not show for example a control system, although a control system is of course present. By way of example, the farm grid 114 may also be designed in another way by virtue of for example a transformer also being present at the output of each wind power installation 100, to mention just one other exemplary embodiment.

The wind farm 112 additionally has a central farm computer 122. This may be connected, via data lines 124 or wirelessly, to the wind power installations 100 in order to interchange data with the wind power installations via this connection and, in particular, to receive measured values from the wind power installations 100 and transmit control values to the wind power installations 100. The central farm computer may form or comprise an evaluation apparatus.

Figure 3:
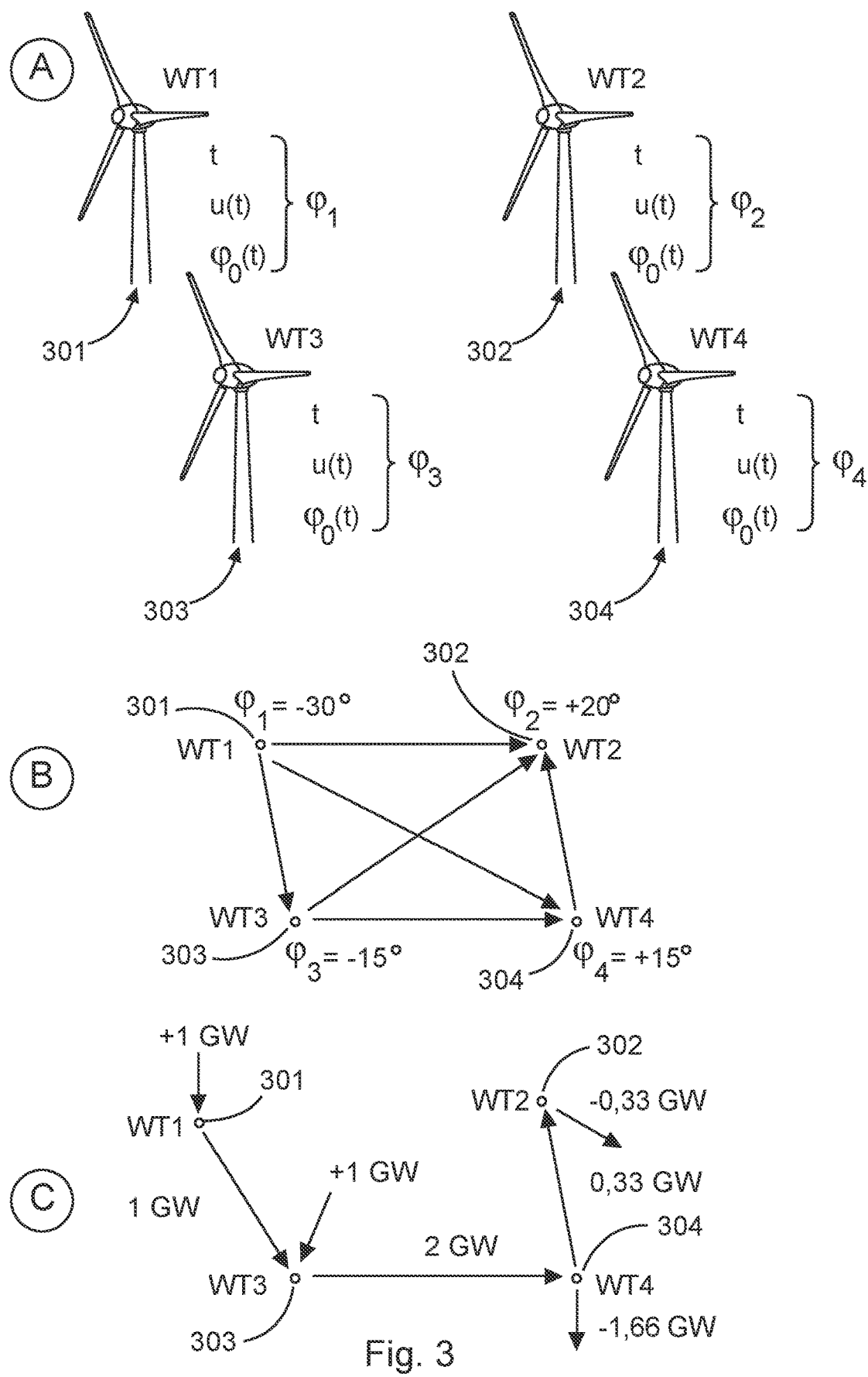
FIG. 3 shows three illustrative partial illustrations A, B and C for four observation nodes, four node phase angles and what is able to be derived therefrom.

FIG. 3 shows, in the three partial illustrations A, B, and C, in each case the same arrangement of four exemplary observation nodes 301 to 304. In the example, each of these observation nodes 301 to 304 forms a grid connection point for a wind power installation. The wind power installations are each marked as WT1 to WT4. Each wind power installation, which may also be representative of a wind farm, acquires the time t with a highly accurate resolution. The voltage u(t) is also measured constantly. A reference phase angle $\varphi_0(t)$ is also acquired. The acquisition of this reference phase angle $\varphi_0(t)$ is identical at all observation nodes 301 to 304, and thus at each of the wind turbines or wind power installations WT1 to WT4. The acquired voltage u(t) has a revolving phase angle, and the reference phase angle $\varphi_0(t)$ likewise revolves. A fixed node phase angle (pi to $\varphi_4$ is able to be acquired therefrom. The node phase angles $\varphi_1$ to $\varphi_4$ thus form the node phase angles of the corresponding observation node 301 to 304. It is thus possible to determine a respective one of the node phase angles $\varphi_1$ to $\varphi_4$ from the acquired variables t, u(t) and $\varphi_0(t)$. This is illustrated in the first part A of FIG. 3 for each of the four wind power installations WT1 to WT4.

In the second portion B of FIG. 3, four values for the node phase angles have been assumed by way of example, specifically $\varphi_1=-30°$, $\varphi_2=+20°$, $\varphi_3=-15°$ and $\varphi_4=+15°$. For the theoretical assumption that all of these observation nodes 301 to 304 are connected to one another, this would result in each case in a direct power flow from one observation node to all of the other observation nodes that have a larger node phase angle. This is indicated by the corresponding arrows in the second portion B.

The third part C of FIG. 3 then shows power flows for the assumption that not all observation nodes 301 to 304 are connected to one another. It is assumed here that there is only a connection between the observation nodes 301 and 303, 303 and 304, and 304 and 302. Assuming in each case existing connecting lines with the same impedance, this results, in the example shown, in a difference between two node phase angles with a magnitude of 15° leading to a power transmission of 1 GW.

There is accordingly a power flow of 1 GW from the observation node 301 to the observation node 303. 1 GW may thus be fed in in the observation node 303, and this power flows to the observation node 303.

A power of 1 GW is likewise fed in at the observation node 303, and is thus added to the power that the observation node 303 has already received from the observation node 301. These 2 GW then flow from the observation node 303 to the observation node 304. On this link, this accordingly results in a difference between the node phase angles of 30°, specifically from $\varphi_3 = -15°$ to $\varphi_4 = +15°$.

At the observation node 304, it is thus assumed that 1.6 GW are dissipated, that is to say consumed, this being marked by −1.66 GW on the observation node 304.

The remaining ⅓ GW then flows from the observation node 304 to the observation node 302. Another ⅓ GW is thus consumed at the observation node 302, this being marked by −0.33 GW. Only a value of 5° accordingly results as the difference between the two node phase angles $\varphi_4$ and $\varphi_2$. The node phase angle $\varphi_4$ is thus 15° and the node phase angle $\varphi_2$ is 20°.

The illustration is of course a simplification, and in particular as far as possible none of the wind power installations WT1 to WT4 should consume power. The wind power installations WT1 to WT4, which may thus also be referred to synonymously as wind turbines, are illustrated because they are used to acquire the values explained in the first part A. By way of example, it is possible for in each case corresponding consumers to be connected and to be operated in the vicinity of the two observation nodes 302 and 304, these each consuming the illustrated output power, possibly in addition to the power that the respective wind power installation also still generates itself at the observation node.

It has thus been identified that a specific load flow is then able to be derived on the basis of the acquired node phase angles $\varphi_1$ to $\varphi_4$. Changes in the grid portion that is illustrated here by the three transmission lines may lead to changes in the relationship between the four illustrated node phase angles, that is to say here in particular to a change in the respective differences between two adjacent node phase angles. If such changes in these phase angle relationships thus arise, then this may be used to conclude as to changes in the grid portion.

One change could for example be that the first node phase angle (pi increases from −30° to −15°. If the other node phase angles $\varphi_2$ to $\varphi_4$, and therefore also their ratios to one another, remain unchanged, it would be possible to derive therefrom that power is no longer flowing between the observation nodes 301 and 303. In the observation node 303, the fed-in power would thus have risen by 1 GW, since the relationship between the node phase angles $\varphi_3$ and $\varphi_4$ of the observation nodes 303 and 304 has not changed, meaning that 2 GW are still flowing from the observation node 303 to the observation node 304. Depending on how quickly the relationship between the two node phase angles $\varphi_1$ and $\varphi_3$ changed, it is possible to conclude as to the type of fault. If the node phase angle $\varphi_1$ rose gradually, then the fed-in power was ramped down at the observation node 301. If it rose suddenly, then a large generator was possibly disconnected from the grid.

It is pointed out, as a precautionary measure, that a wind power installation is at present not able to generate a power of 1 GW. At least an especially large wind farm would be required for this purpose. In this respect too, FIG. 3 is intended only to illustrate that the wind power installations are able to perform measurements. The deactivation, mentioned above by way of example, of a large generator may thus mean that the wind power installation WT1 is arranged at the observation node 301 and, at least in the vicinity thereof, a large generator is likewise connected there and was feeding in at least at the beginning. The wind power installation may thus carry on measuring even after the generator has been disconnected. It could moreover carry on measuring even if it were to be disconnected from the grid itself or if it is representative of a wind farm and this were to be disconnected from the grid.

FIG. 3 thus indicates that wind power installations may be used to acquire grid states such as power flows. They may be distributed over the grid and thereby record the node phase angles at a large number of locations. This does not necessarily have to be performed by wind power installations, but using wind power installations to do this is an efficient solution.

Figure 4:
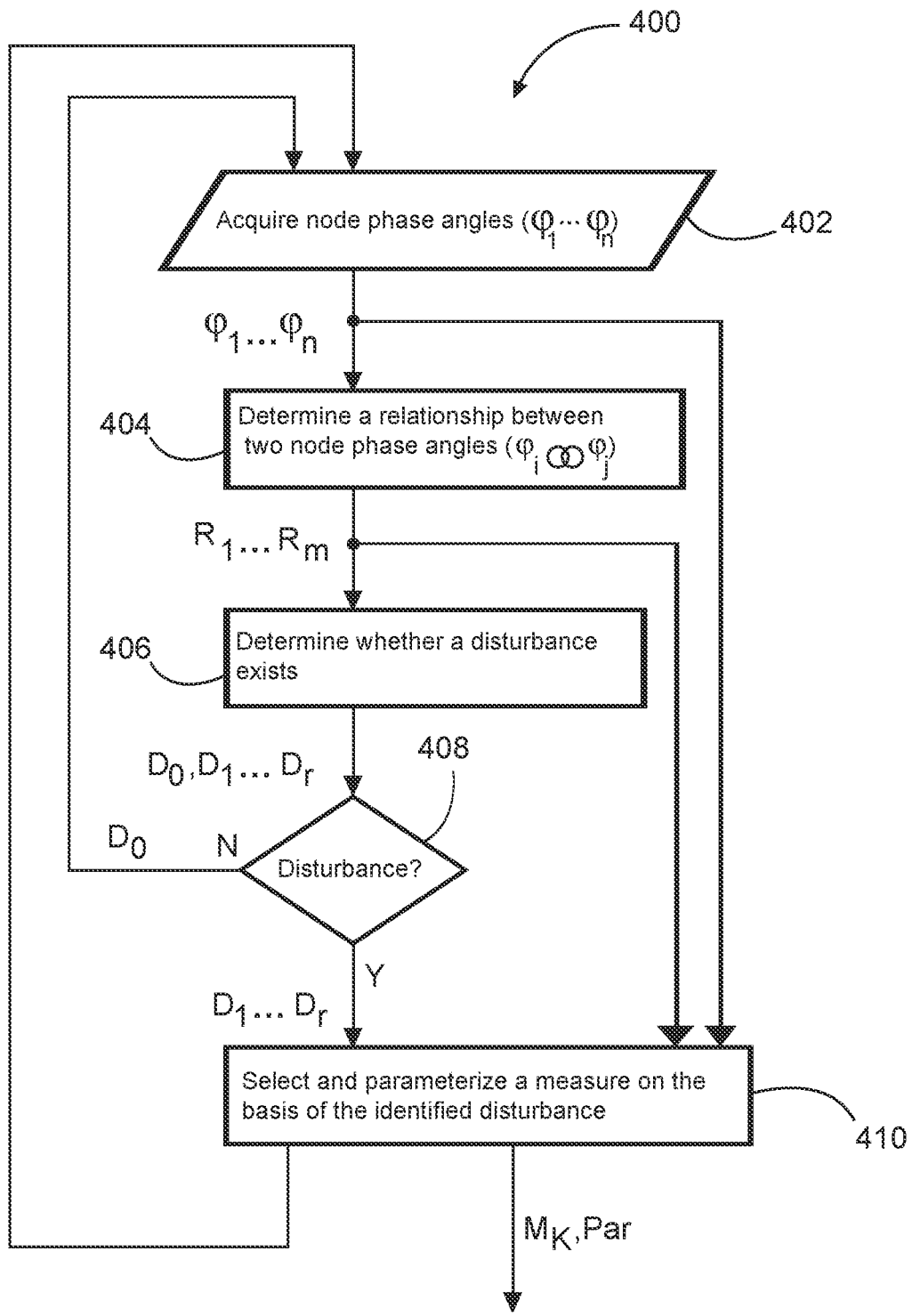
FIG. 4 shows an illustrative flowchart.

FIG. 4 illustrates a sequence of a proposed method for monitoring a three-phase electricity supply grid. The flowchart 400 has an input block 402. The input block 402 may also be referred to as acquisition block, and it illustrates that as many node phase angles $\varphi_1$ to $\varphi_n$ as possible are acquired. These may be for example the node phase angles $\varphi_1$ to $\varphi_4$ of FIG. 3. However, preferably, a great number more of observation nodes are observed, and thus a great number more of node phase angles are recorded. Preferably, at least 50 observation nodes are observed and thus 50 node phase angles $\varphi_1$ to $\varphi_n$ are acquired. In this case, the index n would thus have at least the value 50.

The input block 402 then transfers the node phase angles $\varphi_1$ to $\varphi_n$ thus acquired to the linking block 404. In the linking block, relationships are created between at least in each case two node phase angles. This is symbolized in the linking block 404 by the fact that a node phase angle i is correlated with another node phase angle j. It is in particular possible to form a difference here. Corresponding differences were also formed in the illustration of FIG. 3.

In principle, each node phase angle may be correlated with any other node phase angle, such that n (n−1) relationships could be checked. Due to the specific grid topology, however, it may often make sense to check only a few relationships. By way of example, it is possible to consider phase angle relationships in each case only between two adjacent observation nodes. A node phase angle is then in each case correlated, depending on the position of its observation node, in particular with one, two or three node phase angles.

In any case, this results in the relationships $R_1$ to $R_m$. The index m thus represents how many relationships have been checked or calculated. Moreover, more complex relationships may however also be created than only forming a difference between two node phase angles. By way of example, for such a more complex relationship, it is possible to correlate more than two node phase angles. Relationships between a plurality of node phase angles may however also be considered whereby in each case a plurality of phase angle relationships between in each case two node phase angles are again correlated. By way of example, their mutual propagation may be observed.

The relationships $R_1$ to $R_m$ output by the linking block 404 are then transferred to a calculation block 406. The calculation block 406 in particular checks the received relationships as to whether they give a conclusion as to a disturbance. The result may thus be the identified disturbance, which is referred to here as disturbance $D_1$ to $D_r$. The number of possible disturbances, given by the index r, should usually be considerably smaller than the number of possible relationships and also the number of possible observation nodes or node phase angles. Disturbance Do is the name given to the output that indicates that no disturbance is present.

In the ideal case, the calculation block 406 outputs only one disturbance. This is evaluated at the query block 408. If the query block thus receives the disturbance $D_0$, then it establishes that no disturbance has been identified and the process may return to the input block 402. However, if a disturbance has been identified, then a disturbance $D_1$ to $D_r$ has accordingly been output. This then leads from the query block 408 to the measure block 410.

The measure block 410 may select and parameterize a measure on the basis of the identified disturbance $D_1$ to $D_r$. For this purpose, the measure block receives the specific disturbance, but also further information that led to the disturbance being identified, specifically the node phase angles $\varphi_1$ to $\varphi_n$ and the relationships $R_1$ to $R_m$.

The measure block thus outputs a measure Mk and one or more parameters Par in this respect. These parameters may be entirely different depending on what measure was found. One of the parameters or several of the parameters may in particular involve locating the measure.

Thus, for example, if a power increase is intended to be performed, then this could be the basis for the measure Mk, but additional information is necessary, such as in particular how quickly and with what amplitude the power infeed should be increased, and in particular where this power increase should be performed. It is also possible here for a plurality of generators to take an appropriate measure. To this end, it is also possible for this plurality of generators possibly to take the same measure with a different amplitude. The parameterization, which is marked as Par in the output of the measure block 410, may thus be highly complex.

In the simplest case, each disturbance $D_1$ to $D_r$ could be assigned a measure Mk. The index k would then thus be able to vary from 1 to r.

However, it is also possible for a plurality of disturbances to have occurred and been identified at once. By way of example, a plurality of disturbances may have been identified at different locations. In particular when 50 or more observation nodes are involved, a plurality of disturbances may also be identified. The fact that a plurality of disturbances are identified at the same time may of course indicate that these disturbances have the same root cause.

In any case, the measure block 410 outputs appropriate measures, including parameterization, and the process then returns to the beginning, that is to say to the input block 402.

Figure 5:
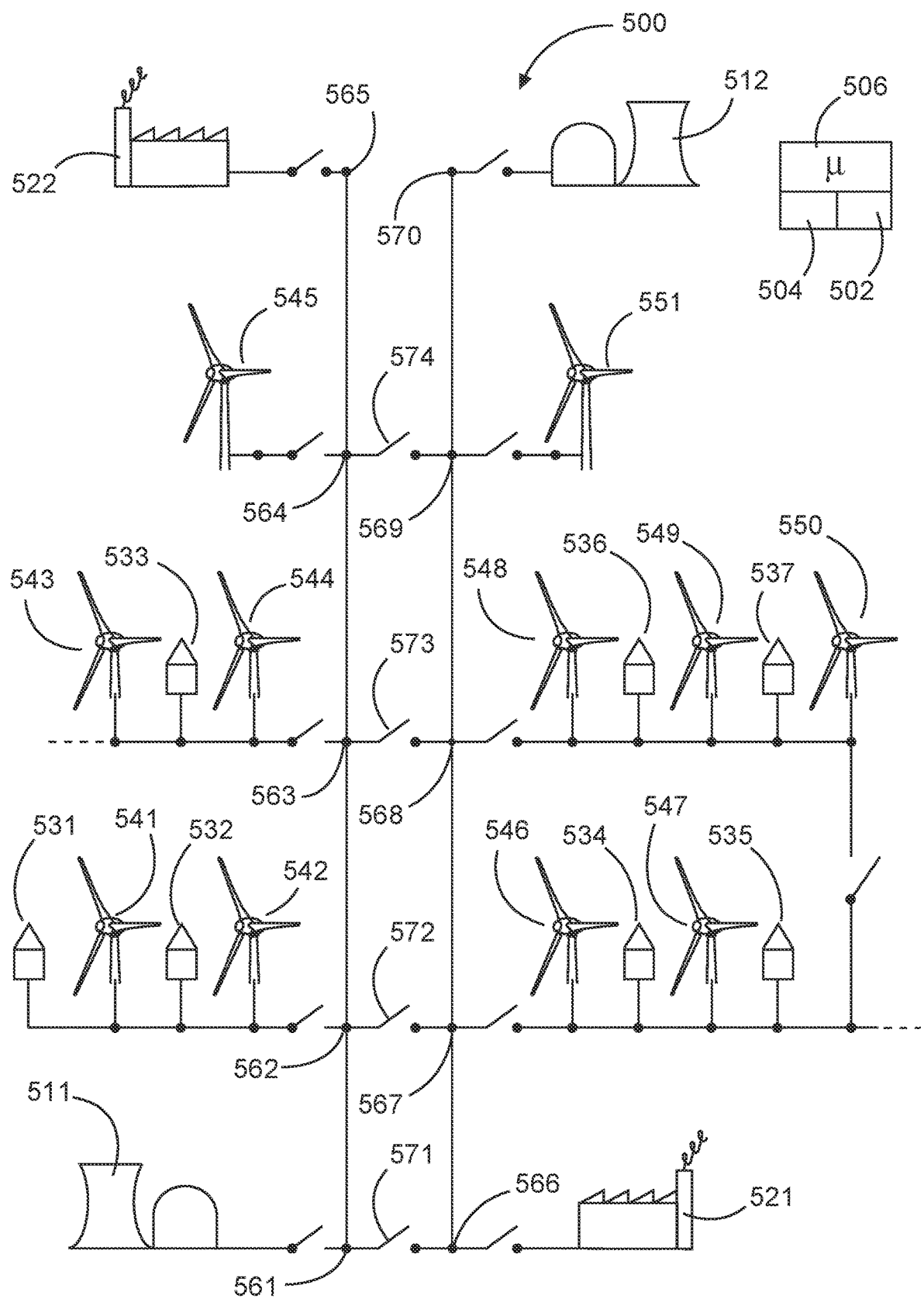
FIG. 5 shows a simplified illustrative illustration of a portion of an electricity supply grid.

FIG. 5 illustrates a grid portion 500 of an electricity supply grid. For monitoring purposes, provision is made for an evaluation apparatus 502, e.g. circuitry, and a checking apparatus 504, e.g. circuitry, which are arranged in a central control center 506.

FIG. 5 shows, highly schematically, a few elements, specifically a first and second power plant 511 and 512, a first and second industrial consumer 521 and 522, seven further consumers 531 to 537 and eleven wind power installations 541 to 551. The seven further consumers 531 to 537 are each illustrated, for the sake of simplicity, as a house, and they may thus represent a village, but also represent other consumers, such as for example an electric charging station. The wind power installations 541 to 551 may also be different, and some of them may form individual wind power installations and some of them may represent wind farms. They may also each all represent a wind farm.

What is important however is that each of these wind power installations 541 to 551 (or the wind farm) serve to record measurements and thus the respective grid connection point at which they feed in, which is not illustrated in FIG. 5 however for the sake of simplicity, thus in each case forms an observation node. The illustrated grid portion 500 thus has eleven observation nodes, which are equated here to the eleven wind power installations 541 to 551 for the sake of simplicity.

The grid portion 500 additionally has a variety of node points, which each, as long as they do not belong to a switch, form a grid node, of which only ten grid nodes 561 to 570 are numbered consecutively for the sake of improved clarity. A variety of circuit breakers are also illustrated, these normally being closed and all being illustrated in open form in FIG. 5 only for the sake of improved clarity. Only four line circuit breakers 571 to 574 are numbered consecutively for the sake of improved clarity.

The line circuit breakers are also otherwise shown only illustratively. Said line circuit breakers 571 to 574 are thus in particular each illustrated in the middle of two transmission lines. The line circuit breaker 571 is thus for example illustrated on a transmission line between the two grid nodes 561 and 566. Of course, a respective line circuit breaker would normally be arranged on each grid node.

A variety of transmission lines are also illustrated, specifically in particular a respective one between two grid nodes and also a respective one between a grid node and a generator or consumer, or between a consumer and a generator. The grid portions are not provided with reference signs for the sake of improved clarity.

The wind power installations 541 to 551 are thus able to acquire measured values at their respective observation node, in particular the ones that have each also been illustrated in the first portion of FIG. 3. As a result, they are each able to output a node phase angle $\varphi_1$ to $\varphi_{11}$ for their observation node and transmit it to the central control center 506. Transmission lines for data are not illustrated for the sake of simplicity. However, any wind power installation or the wind farm that it represents may in particular communicate bidirectionally with the central control center 506.

FIG. 5 is intended to illustrate different grid disturbances and the consequences thereof. By way of example, the two power plants 511 and 512 could also normally feed in a large amount of power, and the two industrial consumers 521 and 522 could consume a large amount of power. In such a state, a large amount of power flows from the first power plant 511 to the first industrial consumer 521 and from the second power plant 512 to the second industrial consumer 522.

If a disturbance then occurs in the first industrial consumer 521, then it is possible for the line circuit breaker between the node 566 and the first industrial consumer 521 to be opened. This leads to a phase jump at the node 566, and this is able to be acquired to the greatest extent by the wind power installation 546, that is to say the observation node assigned there. Slightly later, this phase jump will also propagate further and then be able to be observed next at the wind power installations 542, 548 and 547 or their respectively associated observation nodes, which is not repeated every time below. Slightly later still, this change may for example be able to be observed at the wind power installations 541, 544, 551 and 549. A corresponding wave of a phase angle jump, which runs with a possibly less jumpy shape at a greater distance from the node 566, thus travels through the grid or the grid portion 500 that is shown.

The fact that it has now been accurately identified when which wind power installation observed what phase angle jump or what phase angle change makes it possible to conclude, from this wave movement, as to the location and the fact that the industrial consumer 521 has been disconnected.

Depending on the magnitude of the disturbance thus identified, it is in particular possible to prompt the wind power installations located in the vicinity to feed in less power, since less power is consumed and thus less is required due to the disconnection of the industrial consumer 521. In addition to the phase angle jump, at this time there is thus also a power excess, which was able to be identified through this phase angle jump. The direction of the phase angle jump is thereby of course also evaluated. Reference is made to the explanation regarding FIG. 3 for statements that may be drawn from the corresponding direction.

A further disturbance is described below by way of illustration, this possibly arising due to the disconnection of the industrial consumer 521. A majority of the power fed in by the first power plant 511 could then in this case look for a new destination and thus ultimately also flow, in the grid section 500, in the direction of the second large power plant 512. This may lead to the power infeed of the large power plant 512 declining. However, an excessive amount of power will then very quickly be available in the large power plant 512, which is then fed in and could then flow, in the manner of a wave, back in the direction of the first large power plant 511.

All this is a highly illustrative depiction, but it is in any case possible for there to be a power oscillation between the two large power plants 511 and 512. To counteract this, for example, some wind power installations, for example in particular the wind power installations 551 in the vicinity of the second large power plant and 542 in the vicinity of the first large power plant, could for example reduce or increase their power infeed anti-cyclically, as it were.

A topology changeover may however also be considered, for example. It may in particular be considered to divert the power flow by opening or closing in each case one of the line circuit breakers 571 to 574.

A further possible disturbance is a cascaded split. The cascaded split could also begin with the disconnection, already outlined above, of the industrial consumer 521. One consequence could be that—this is in particular also outlined for the purposes of the illustration—the first large power plant 511 is disconnected from the grid. The reason could be a resulting overvoltage or an increase in the fed-in current due to the already described power oscillation. However, the reason may also be a manual disconnection of this first large power plant 511 from a control center.

If a majority of the generated power from the large power plant 511 is or was required for the first industrial consumer 521, and this industrial consumer 521 disconnects from the grid, the consequence is that there is far too much power generated by the first large power plant 511 in the grid, which could prompt a manual grid split. It may be left open whether such a manual disconnection is a human error or the correct decision.

In any case, such a second disconnection would result in another phase jump that is detected first at the wind power installation 542, and then only slightly later at the wind power installations 546 and 544, and even later at further wind power installations. A second wave of the node phase angles has thus been identified, this having started slightly later and having a slightly different origin.

A further consequence may be that there is too little power in the grid portion 500 following deactivation of the large power plant 511. If for example the two wind power installations 541 and 542 are then currently feeding in only very little power, in any case significantly less than the consumers 531 and 532 require, then an excessively high current possibly flows at the grid node 562 in the direction of these consumers. The line circuit breaker between the wind power installation 542 and the grid node 562 could trip.

This would result in the third disconnection, here the disconnection of a grid portion. This could also be detected by the other wind power installations. Of the wind power installations still remaining in the grid portion 500, this would possibly first be identified at the wind power installations 546 and 544, until it propagates to further wind power installations.

A cascaded split may thereby be identified, and countermeasures may be initiated. If the disconnection is able to be located well, it may also be identified which power inflows or outflows have been disconnected in each case, and the power deficit or the power excess may thus quickly be identified and compensated for through an appropriate control operation. In this case too, it is possible in particular to quickly adapt the power of the wind power installations, since these are very fast regulation units in the electricity supply grid. For brief measures, these are also able to temporarily provide a significant power increase.

A further disturbance may also be the isolation of a transmission line. If for example the line circuit breaker 572 is opened, and therefore the transmission line between the nodes 562 and 567 is thus opened, then the ratio between the node phase angles of the two wind power installations 542 and 546 changes. Other wind power installations are also able to detect effects, but these two wind power installations detect the greatest effect, and this disconnection is thus also able to be located.

It is likewise possible to identify the disconnection of a sub-grid, also referred to as system split. By way of example, it is possible to identify when all four line circuit breakers 571 to 574 are open. This may occur for example when one or more transmission lines need to be deactivated for maintenance reasons or for other reasons, and only two or possibly even only one of said four line circuit breakers is closed.

The severe power outage in the European integrated grid on Nov. 4, 2006 may in particular be given here by way of simplification. A high-voltage link with two transmission lines was deactivated then in order to deliver a cruise ship. This could for example be the transmission lines 571 and 572. In that case, there was additionally a large power flow, which could be illustrated for example by a power flow from the "right-hand side of FIG. 5" to the "left-hand side of FIG. 5." The four line circuit breakers 571 to 574 thus form the split between these two sides. All of the power could then however still be transmitted via the transmission lines of the remaining line circuit breakers 573 and 574 that are supposed to be closed.

The problem that was overlooked however was that one of these two transmission lines was likewise disconnected for maintenance purposes. The result was that, if for example the circuit breaker 573 was unintentionally opened, the entire power then had to flow through the transmission line having the line circuit breaker 574. This however exceeded the permitted transmission power and then likewise led to a safety deactivation. This too is of course illustrated in a highly simplified manner.

In any case, the circuit breaker 574 is then opened as the last of the four mentioned, and this is reflected immediately in the phase angles as it were of the wind power installations remaining in the right-hand part, on the one hand, and the wind power installations remaining in the left-hand part, on the other hand. It is then possible to immediately identify what problem is present.

The magnitude of the power previously transmitted via the lines also gives the magnitude of the power deficit resulting from the disconnection on one side and of the power excess on the other side.

This could also be read from the node phase angles, as was explained in FIG. 3. The wind power installations on the right-hand side could in particular accordingly immediately reduce their power in order to reduce the power excess there. On the other hand, a power increase together with the ramping down or emergency deactivation of some consumers in the left-hand part could be performed.

Moreover, the event of Nov. 4, 2006 would possibly have been able to be prevented, since the increased power flow would already have been recognized owing to the power deactivated for maintenance purposes. The imminent instability would have been identified at the latest following the isolation. It would have been possible to respond thereto, specifically by immediately reducing the power generation "on the right-hand" side of the wind power installations. The transmission power over the remaining single transmission line would then possibly have been able to be lowered quickly enough to a permissible extent. In fact, immediately before the event on Nov. 4, 2006, a large amount of power had been transmitted from wind power installations. The wind power installations in question could have immediately reduced their power by way of an appropriate control command.

As mentioned, the process on Nov. 4, 2006 was of course far more complex and has been given here only for the purpose of improved explanation.

It is also possible to identify a topology changeover, to cite a further example of a disturbance. A topology changeover may be one of said disconnections of the transmission line, that is to say the isolation of the line circuit breakers 571 and 572, but a topology changeover may also in particular be such that one circuit breaker has been opened and another one has been closed. By way of example, the line circuit breaker 574 could be opened and the line circuit breaker 573 could be closed, for whatever reason.

The same number of transmission lines "from the right-hand to the left-hand side" are thereby still available, even with the same capacity, but the channeling of the power flow has nevertheless changed. In particular the power flow from the second large power plant 512 to the second industrial consumer 522 has changed. The wind power installations 544, 545, 548 and 551 may in particular identify this change of topology best at the acquired node phase angles or the evaluation apparatus 502 may identify this on the basis of the node phase angles that these four said wind power installations deliver.

It is also possible here that no assistive measure needs to be taken, or, due to the now extended path of said power flow, voltage support measures able to be carried out by some wind power installations could come into consideration.

The following in particular has been identified according to the disclosure.

In distributed three-phase current grids, load flows and dynamic effects between the nodes give rise to phase shifts in the node voltages (static and dynamic). The shift results primarily from the voltage drop across the grid impedance (static) and is greater the greater the grid impedance and the greater the load flow via the grid impedance. Grid oscillations and disturbances however also run through the grid and are able to be identified in a response of the voltage angles at the grid nodes. Overall, the static phase shift from the grid center may be up to +/−90°.

It has also been identified that an operator of wind power installations may have access to thousands of measurement points of the voltage in the grid, and may thus have access to considerably more measurement points than the other grid operators. One idea is to use the information about the distribution of the grid phase angles to identify dynamic grid effects and stability limits.

A proposal has been found to thereby assess grid stability. This makes it possible to identify power oscillations and also to identify grid disturbances and topology changeovers that influence grid stability.

It also becomes possible to identify grid disturbances and dynamic effects, in particular a system split, a cascaded split of grid sections, generators and consumers, a failure of lines and loss of redundancy and short circuits. It is possible to identify power oscillations and to assess stability and activate measures for improving stability. It is also possible to identify dynamic effects and a response thereto.

One idea is to acquire and to evaluate the voltage angle of the grid voltage at as far as possible all wind power installations (or alternatively at all wind farms). The following information, or some of it, should in this case be present in situ:

Highly precise time information, a GPS or another time signal, reference angle and reference time, voltage angle information (phase shift with respect to the reference angle).

Some of the information may be obtained from an inverter controller, from a grid data monitoring module (external or internal evaluation), or from measurements on a farm controller or a farm control unit (FCU).

One proposal is to mark the measured voltage vector with a time signal and to evaluate it centrally for system-wide use. In this case, time delays in the communication between the time module and the grid measurement module should be as small as possible, or at least always of the same length.

It is proposed for the angle information to be evaluated together with the location at a central center. It is possible to calculate a precise image of the relative load flows in the grid between the grid nodes therefrom. The optional enrichment with static topological grid information makes it possible to determine the following in real time:

A grid group assignment of a wind power installation in the distribution grid (to which transmission grid nodes which wind farm is currently operatively connected). It is also possible to determine a current topological structure of the grid (switch positions, busbar interconnections, deactivations of lines).

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for monitoring a three-phase electricity supply grid, wherein the electricity supply grid has:
   a grid topology with a plurality of grid nodes that are spatially distributed, and the plurality of grid nodes in the form of observation nodes at each of which at least one voltage is acquired in terms of absolute value and phase, the method comprising:

acquiring at least one node voltage at each observation node, such that a plurality of node voltages are acquired, wherein:
  each node voltage has a node phase angle, and
  each node phase angle, of a plurality of node phase angles, represents a respective phase angle between a node voltage, of the plurality of node voltages, and a reference phase angle, ascertaining at least one phase angle relationship that represents a relationship between at least two of the plurality of node phase angles distributed over the grid topology, and checking the electricity supply grid for a grid disturbance based on the at least one phase angle relationship, wherein a type of the checked grid disturbance is selected from a list of types of grid disturbances including:
  a topology changeover, in which the grid topology is changed by at least one changeover,
  a grid split, in which at least two grid portions are disconnected from each other,
  a cascaded split, in which:
    grid portions of the electricity supply grid are progressively disconnected from each other,
    generators potentially feeding into the electricity supply grid are disconnected from the electricity supply grid, or
    consumers potentially drawing power from the electricity supply grid are disconnected from the electricity supply grid,
  a failure of at least one power transmission path on which power was being transmitted between at least two grid nodes prior to the failure,
  a grid short circuit, in which at least one short circuit occurs between two phases of the electricity supply grid or at least between a phase of the electricity supply grid and ground, and
  a power oscillation, in which the power oscillates between grid portions of the electricity supply grid.

2. The method as claimed in claim 1, wherein a temporal and spatial change in the plurality of node phase angles is evaluated to check for the grid disturbance.

3. The method as claimed in claim 1, wherein:
phase angles, in each case revolving at a frequency, of the node voltage are acquired,
an average frequency or an average frequency drift of the electricity supply grid or of a grid portion is acquired from the phase angles revolving at the frequency.

4. The method as claimed in claim 1, wherein a power balance of the electricity supply grid or of the grid portion is derived from a frequency drift.

5. The method as claimed in claim 1, wherein the grid disturbances are assessed in terms of grid disturbance type or amplitude based on the at least one phase angle relationship.

6. The method as claimed in claim 1, wherein grid disturbance is a power oscillation, wherein checking for the power oscillation comprises:
checking for a presence of a periodic load flow variation based on the at least one phase angle relationship,
wherein a periodic load flow variation describes a periodically repeating variation of a power flow, and the load flow describes a power flow between at least two grid portions or on a high-voltage transmission line,
wherein a power oscillation is assumed when a value of a periodic load flow variation that lies above a predefinable variation reference value has been identified.

7. The method as claimed in claim 6, wherein the predefinable variation reference value is at least 10%.

8. The method as claimed in claim 1, wherein the grid disturbances is a grid split, wherein checking for the grid split comprises:
checking for a presence of a node phase wave,
wherein the node phase wave describes a change in a node phase angle that propagates from at least one of the observation nodes to another observation nodes, and
wherein the grid split is assumed when:
  a change in a node phase angle at a first observation node has been identified by a value that has at least one predefinable first change reference angle in terms of absolute value, and
  a propagation time later, a change in a node phase angle at at least one second observation node has been identified by a value that has at least one predefinable second change reference angle in terms of absolute value.

9. The method as claimed in claim 8, wherein the second change reference angle is smaller than the first change reference angle and is at least 5°, or the propagation time is in the range from 20 milliseconds (ms) to 100 ms.

10. The method as claimed in claim 1, wherein the grid disturbances is a cascaded split, wherein checking for the cascaded split comprises:
checking for a presence of a plurality of voltage jumps, wherein each voltage jump of the plurality of voltage jumps occurs as a node phase angle jump in a node phase angle at an observation node with respect to a node phase angle at another observation node, and
observing at least three phase angle jumps, wherein
wherein the cascaded split is assumed when each of the node phase jumps has a node phase angle change of at least a predefinable reference angle change, with a time difference between two respective node phase jumps, wherein the time difference is referred to as jump difference and is in the range from 100 milliseconds (ms) to 10 seconds (s), and wherein each of the node phase jumps has a jump magnitude of at least 0.5°.

11. The method as claimed in claim 1, wherein the grid disturbances is a failure of lines, wherein checking for the failure of lines comprises:
checking for a presence of an increased node phase angle difference between node phase angles of two observation nodes,
wherein an increased node phase angle difference and at least a failure of a line is assumed when an acquired node phase angle difference lies at least a predetermined offset angle above an average node phase angle difference for these two observation nodes in terms of absolute value, and
wherein the offset angle has a value of at least 3°, or wherein the offset angle is at least 25% of the average node phase angle difference.

12. The method as claimed in claim 1, wherein the grid disturbance in the grid topology is located based on the at least one node phase relationship.

13. The method as claimed in claim 1, comprising assessing a grid stability of the electricity supply grid based on at least one detected grid disturbance, wherein the assessing takes place based on at least one acquired disturbance property of the grid disturbance selected from the list of properties containing:

a detected location of the grid disturbance,
a type of grid disturbance, and
an amplitude of the detected grid disturbance.

14. The method as claimed in claim 1, comprising:
performing a stabilization measure based on:
at least one detected grid disturbance, or
an assessment of a grid stability from a list comprising:
opening or closing at least one circuit breaker of the electricity supply grid,
disconnecting or connecting a generator,
disconnecting or connecting a consumer,
specifying a change in fed-in active power,
specifying a change in fed-in reactive power, and
implementing or setting an attenuation measure, in which a frequency-dependent power regulation or a voltage-dependent reactive power regulation is set in each case in terms of its transmission behavior.

15. The method as claimed in claim 1, comprising:
acquiring at least one of the node voltages and node phase angles, in each case, by way of a wind power installation or wind farm connected to the electricity supply grid at the respective observation node, or
performing at least one stabilization measure by the one wind power installation or wind farm connected to the electricity supply grid at the respective observation node.

16. The method as claimed in claim 1, wherein the method uses at least 50 observation nodes, and acquires node voltages at each of the at least 50 observation nodes, and uses the node voltages to ascertain, in each case, at least one phase angle relationship.

17. A monitoring arrangement for monitoring a three-phase electricity supply grid,
wherein the electricity supply grid has:
a grid topology with a plurality of grid nodes that are spatially distributed, and
the plurality of grid nodes are in the form of observation nodes at each of which at least one voltage is acquired in terms of absolute value and phase,
wherein the monitoring arrangement comprising:
a respective acquisition apparatus for each observation node configured to acquire at least one node voltage at the respective observation node such that a plurality of node voltages are acquired, wherein:
each node voltage has a node phase angle, and
each node phase angle, of a plurality of node phase angles, represents a respective phase angle between a node voltage, of the plurality of node voltages, and a reference phase angle,
an evaluation apparatus configured to ascertain at least one phase angle relationship that represents a relationship between at least two of the node phase angles distributed over the grid topology, and
a checking apparatus configured to check the electricity supply grid for a grid disturbance based on the at least one phase angle relationship,
wherein a type of the checked grid disturbance is selected from a list of types of grid disturbances including:
a topology changeover, in which the grid topology is changed by at least one changeover,
a grid split, in which at least two grid portions are disconnected from each other,
a cascaded split, in which:
grid portions of the electricity supply grid are progressively disconnected from each other,
generators potentially feeding into the electricity supply grid are disconnected from the electricity supply grid, or
consumers potentially drawing power from the electricity supply grid are disconnected from the electricity supply grid,
a failure of at least one power transmission path on which power was being transmitted between at least two grid nodes prior to the failure,
a grid short circuit, in which at least one short circuit occurs between two phases of the electricity supply grid or at least between a phase of the electricity supply grid and ground, and
a power oscillation, in which the power oscillates between grid portions of the electricity supply grid.

18. The monitoring arrangement as claimed in claim 17, wherein:
one or more of the acquisition apparatuses are implemented in a wind power installation or a wind farm, or
one or more of the observation nodes are grid connection points, via which a respective generator of a wind power installation or a wind farm feeds into the electricity supply grid.

19. A method for monitoring a three-phase electricity supply grid, wherein the electricity supply grid has:
a grid topology with a plurality of grid nodes that are spatially distributed, and
the plurality of grid nodes are in the form of observation nodes at each of which at least one voltage is acquired in terms of absolute value and phase, the method comprising:
acquiring at least one node voltage at each observation node, such that a plurality of node voltages are acquired, wherein:
each node voltage has a node phase angle, and
each node phase angle, of a plurality of node phase angles, represents a respective phase angle between a node voltage, of the plurality of node voltages, and a reference phase angle,
ascertaining at least one phase angle relationship that represents a relationship between at least two of the plurality of node phase angles distributed over the grid topology,
checking the electricity supply grid for a grid disturbance based on the at least one phase angle relationship, and
performing a stabilization measure based on:
at least one detected grid disturbance, or
an assessment of a grid stability from a list comprising:
opening or closing at least one circuit breaker of the electricity supply grid,
disconnecting or connecting a generator,
disconnecting or connecting a consumer,
specifying a change in fed-in active power,
specifying a change in fed-in reactive power, and
implementing or setting an attenuation measure, in which a frequency-dependent power regulation or a voltage-dependent reactive power regulation is set in each case in terms of its transmission behavior.

* * * * *